March 4, 1958 J. C. PAGE 2,825,194
DEVICE FOR APPLYING HEAT SEALING FILM
Filed Nov. 4, 1953 2 Sheets-Sheet 1
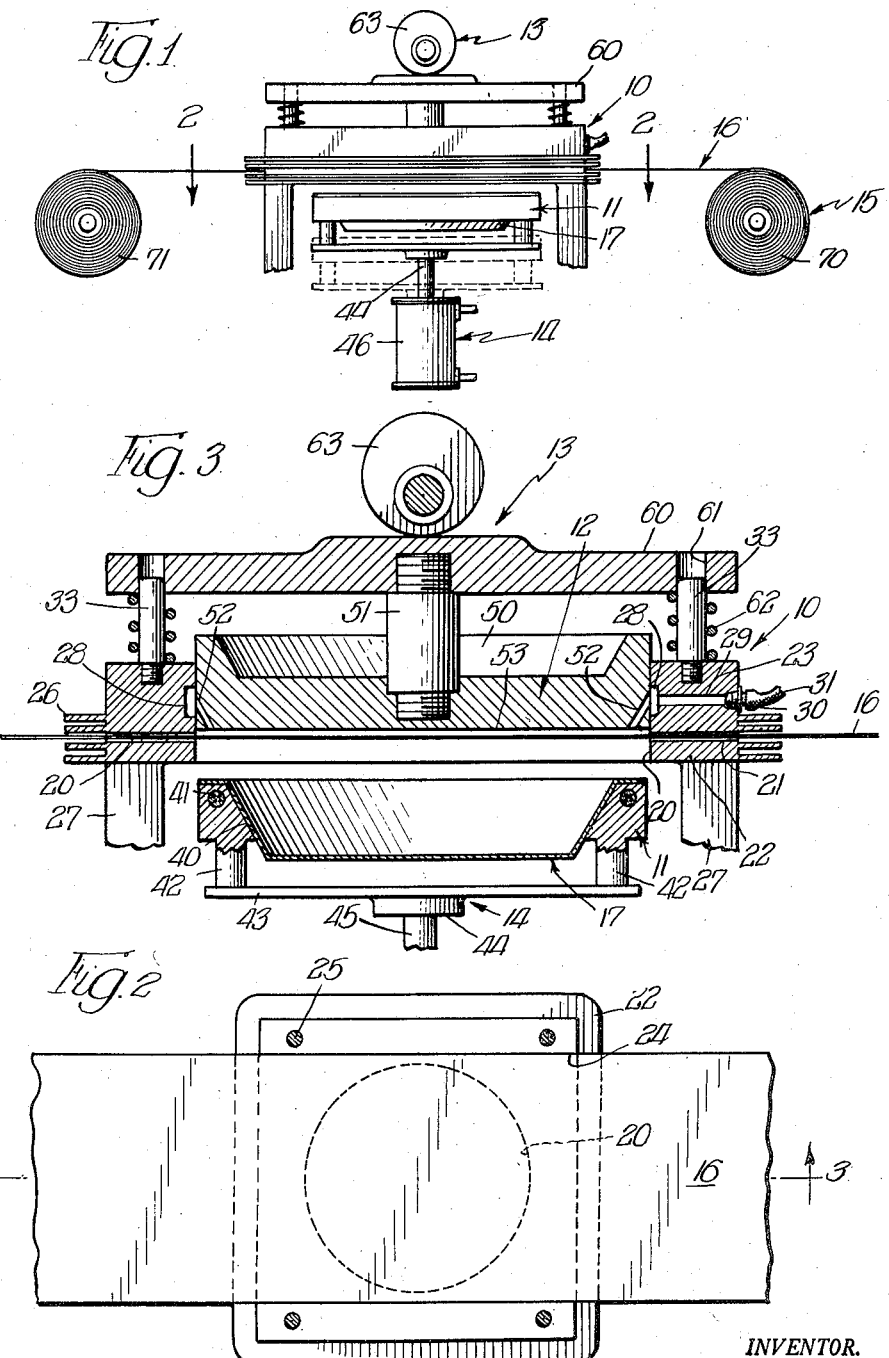
INVENTOR.
Jack C. Page, March 4, 1958
J. C. PAGE
2,825,194
DEVICE FOR APPLYING HEAT SEALING FILM
Filed Nov. 4, 1953
2 Sheets-Sheet 2
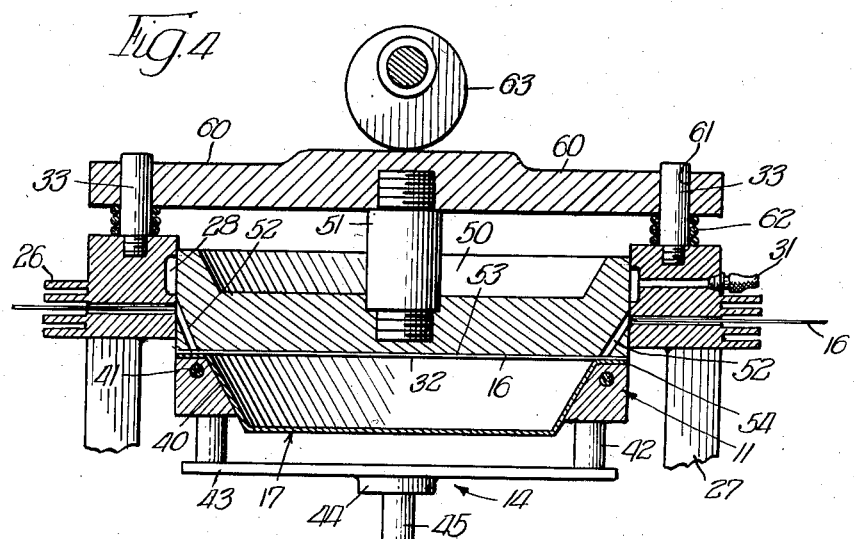
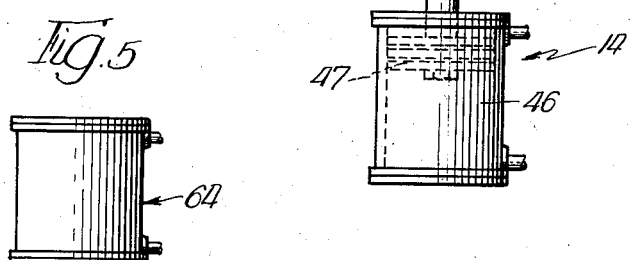
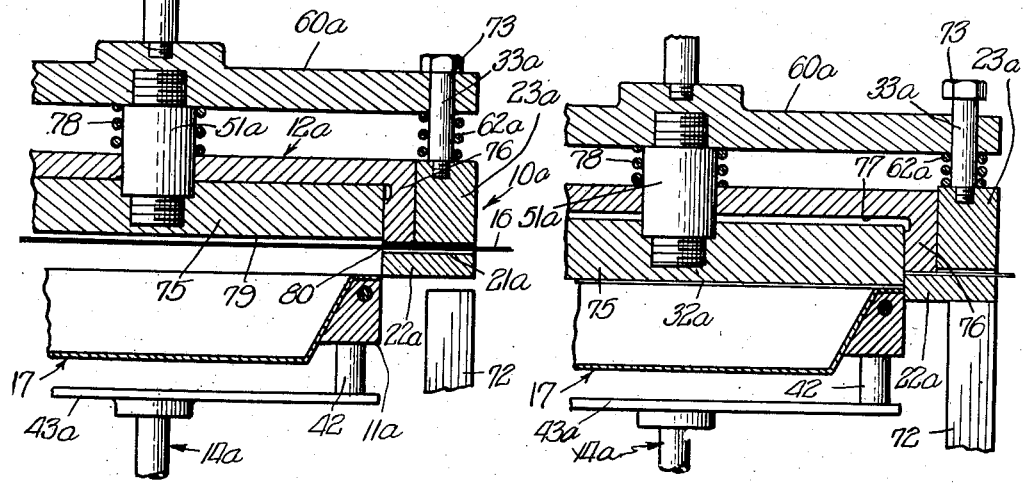
INVENTOR.
Jack C. Page,
BY

United States Patent Office 2,825,194
Patented Mar. 4, 1958

2,825,194

DEVICE FOR APPLYING HEAT SEALING FILM

Jack C. Page, Morton Grove, Ill.

Application November 4, 1953, Serial No. 390,120

7 Claims. (Cl. 53—287)

This invention relates to improvements in applicators and more specifically to an improved device for the direct application of thermo-setting or thermo-plastic cover seals to containers.

In the packaging of food stuffs it has become a present-day practice to place various items of food in containers having transparent covers so that the houswife or purchaser may easily view the contents of the container. Such items, for example, as cottage cheese, frozen pies, various frozen vegetables, etc., are now packaged in this manner, making the same not only attractive from the standpoint of merchandising display, but likewise attractive to the purchaser from the standpoint of viewing the contents. According to such present practice, so far as I am aware, the application of the transparent film coverings to containers for this purpose is accomplished in a somewhat primitive manner substantially by hand and by employing loosely fitting lids or covers having transparent window portions.

The device and scheme of my present invention is intended to apply and seal mechanically, transparent films or cover materials of a thermo-plastic or thermo-setting nature directly to containers, especially metal containers, thereby greatly improving present practice for this type of packaging.

Briefly, my invention includes a pair of dies, one hot and one cold, between which a film of thermo-plastic material is advanced for periodic engagement by a punch means cooperating with the two dies and arranged to hold tightly a section of such thermo-plastic film to the top and along the peripheral boundaries of a suitable metal or heat conductive container to seal the film directly with the container under pressure and heat.

The main object of this invention is to provide a new, improved and simple means for the direct application of transparent, thermo-plastic or thermo-setting films to and over the open top of containers, such film being sealed with the container under heat and pressure.

Another object of my invention is to provide a new and improved hot and cold die and punch mechanism whereby means for the application of thermo-plastic, transparent or opaque films to food carrying containers and the like is mechanically carried out.

Still another object of my invention is to provide a new and improved mechanism for the application and sealing of thermo-plastic film covers directly to metal containers to effect economies and improvements in the packaging of foodstuffs and similar items.

The above and further objects, features and advantages of my present invention will be recognized by those familiar with this subject from the description and specifications therefor which follow and from two embodiments of its concepts as illustrated in the accompanying drawings.

In the drawings:

Figure 1 is a front elevational view, showing the arrangement of my new applicator means in its association with a continuous web of covering material, preferably of a thermo-plastic, transparent nature;

Figure 2 is a partial plan view in cross-section, taken substantially from the vantage line 2, 2 of Figure 1, showing the relationship of the applicator means of my invention to the web of covering material and the manner in which the latter is fed through my applicator;

Figure 3 is an enlarged cross-sectional view taken substantially along line 3, 3 of Figure 2, to illustrate the various elements and portions of my device as they are related ready for the application of a thermo-plastic cover;

Figure 4 is an enlarged cross-sectional view, similar to Figure 3, illustrating the mechanism of my invention in its operating position for applying the film to a container;

Figure 5 is a partial cross-sectional view, similar to Figures 3 and 4, but illustrating an alternate structure for accomplishing the purposes of my invention; such being shown in a non-operating position; and Figure 6 is a partial cross sectional view, similar to Figure 5, but showing my alternate mechanism in position for applying a thermo-plastic cover or film to a container, as illustrated.

Turning now to the features and concepts of the preferred form of my invention illustrated in Figures 1 through 4 of the drawings, it will be appreciated that such comprises a cold die 10, a hot die 11, a punch member 12, movable within the cold die and relative to both of the dies, a first actuating means 13 for raising and lowering the punch member 12, a second actuating means 14 related with the hot die for raising and lowering the same, and feed means 15 for supporting and advancing a continuous film 16 of thermo-plastic material between the two named dies.

The above named portions of my device are best shown in Figures 1, 3 and 4 of the drawings.

The cold die 10 comprises an open centered plate which may be annular in shape if desired, or otherwise. In the particular form for die 10 herein illustrated (which is designed for the application of circular covers to a pie-shaped pan or container 17) the center opening 20 thereof is circular or cylindrical, having walls which are finely machined and accurately finished for close fitting cooperation with punch member 12. The cold die is further provided with a slotted passageway 21 for the travel of the thermo-plastic web 16 which is utilized for covering the container. To form this slotted passageway, a composite structure for the cold die 10 may be used comprising a lower die section 22 and an upper die section 23. Across and inwardly of the upper face of section 22, a recess of the desired width and depth for the passageway 21 is formed. The lower section 22 is then registeringly attached to the underside of the upper die section 23 as by machine bolts 25. To assure the continued coolness of the cold die during operation, I prefer that a plurality of air cooling fins 26 be formed adjacent the outer periphery thereof. The cold die is supported horizontally by a suitable means, for example, post members, as indicated generally at 27, 27.

The cold die is further provided with an annular channel or groove 28 formed inwardly of the cylindrical walls of the central opening 20 therein. Communicating with such groove is a bored chamber 29 formed through the walls of the cold die and threaded at its outer end for the holding of a pipe fitting 30 which receives and joins with a vacuum tube on line 31, substantially as shown. Such an arrangement of the groove 28, chamber 29 and vacuum line 31, comprises a means for holding a cover disc 32 of the thin plastic film 16 to the bottom of the punch 12 after it is cut out from the film 16 by the punch. As will be understood, such a vacuum holding means is optional and may be avoided, if desired, by other arrangement, as, for example, by the modified structure shown in Figures 5 and 6.

Mounted to the upper face of the cold die are a plurality of vertically protruding guide posts or rods 33 for guiding the vertical movements of the punch member 12 by its related actuator 13, as will be explained presently.

The hot die 11 is formed substantially as an annulus of metal having a conical hollow or opening 40 formed centrally thereof for receiving, supporting and locating a pan container 17 to which the thermo-plastic cover is to be attached. It will be appreciated that the particular formation of the opening 40 depends by-and-large on the particular style of container with which it is to be used. Thusly, other opening configurations, for example, rectangular or cylindrical, may be employed for this purpose in the hot die. The external diameter of the hot die 11 is such as is substantially equal that of the punch 12. Means for heating the hot die to heat the disc of thermo-plastic material 32 and the container 17, which incidentally is preferably metal comprising heavy aluminum foil or the like, comprises, for example, an electrical heating element 41 disposed internally of the hot die and supplied by a suitable source of electrical power. The hot die 11 is supported on a plurality of post members 42, 42, which in turn are attached at their lower ends to a table or platform element 43 having a central boss 44 rigidly related to a piston rod 45 of a hydraulic or pneumatic cylinder 46 and piston 47, which form the working elements of the hot die actuator 14. Such a cylinder and piston arrangement may, of course, be replaced by other suitable arrangements to actuate the hot die with a vertical reciprocating motion. Reciprocation of the hot die in this first form of my invention is essential to the loading and unloading of the pan or container means 17.

The punch member 12, as herein illustrated, is formed as a solid metal disc, substantially cylindrical in formation and having a recess 50 in its upper face. The punch fits closely within the central opening 20 of the cold die. An actuating post 51 is threaded centrally into the upper end or face of the punch. Formed angularly inward of the sides of such punch are a plurality of inclined chambers 52, 52 which communicate between the recessed chamber 28 of the cold die and the lower face 53 of the punch to assure operation of the illustrated vacuum holding system. Relative movement between punch 12 and die 10, without interrupting vacuum communication between line 31 and the lower face of the punch, is permitted by forming the chamber 28 of the cold die with sufficient vertical dimension to accommodate this feature. Since the punch moves within the cold die, its movement to place the chambers 52 beyond the limits of vacuum chamber 28 serves as a cut-off valve means to the vacuum system.

As the punch moves within the cold die, its downward progress across the web passageway 21 acts first to shear or sever the web material 16 and punch a circular cover disc 32 therefrom, according to the form of this illustrated opening 20 of the cold die. The external diameter of the punch, of course, is related to the specific style and size of the pan container 17 to which the cover 32 is to be attached. After cuitting of the plastic material in this manner and during the latter's downward passage through the cold die, the vacuum holding system provided by the chambering of the cold die at 28—29 and the passage chamber 52 of the punch, serves to hold the cover disc in registry on the lower face of the punch until the same is pressed onto the rim or lip 54 of the container.

Means for actuating the punch 12 with vertical reciprocating motion comprises a horizontal plate 60 fixed to the upper end of the central post 51 carried by the punch, such plate having a plurality of openings 61 formed near its edges equal in number to the number of guide posts 33 projecting from the cold die. Mounted about each guide post and intermediate the adjacent faces of the pressure plate 60 and the cold die 10 is a compression spring 62. A simple eccentric means 63, or similar motivating means, is utilized for pushing the plate 60, central post 51 and punch 12 downwardly according to known principles to compress the spring members 62. Raising of the punch takes place upon continued rotation of the eccentric means and return action of the spring members 62.

It will be understood that the eccentric means is but one of several styles of reciprocating actuators which may be employed for the purpose outlined above. For example, a hydraulic or pneumatic means, similar to actuator 14, could be employed as well (see Figure 5 at 64).

The thermo-plastic film or web 16, as illustrated, is to be advanced by some means 15 comprising, for example, two cylindrical rollers 70, 71, one of which should be power driven. Such rollers are actuated at a desired regulated speed conforming to the operating cycle of the punch whereby the feeding of the plastic film through and between the hot and cold dies is maintained for automatic operation.

Turning now to the features of the alternate structure shown in Figures 5 and 6 of the drawings, it will be seen that the makeup of the hot die 11a and its mode of supporting a pan means 17, the means 42a, 43a for supporting the hot die and actuating means 14a therefor are identical to that relating to die 11 previously shown and described.

The cold die 10a therein differs somewhat from the cold die 10, heretofore described, in that it lacks the vacuum chamber and vacuum system for holding cut-out cover discs 32 and further in that its lower section 22a, corresponding to section 22 of cold die 10 in Figure 1, extends radially inward of the upper section 23a thereof, thereby forming an offset shoulder in the central opening of the cold die. That is to say, the inward radial extension of 22a forms a shoulder against which a portion of the punch 12a works, as will be related presently. A web passage means comprising a slotted opening 21a is provided substantially as before. Cold die 10a, however, works against a stop member 72 and is not rigidly held on stanchions or support posts. Guide posts 33a, associated with the cold die as with die 10, guide a plate 60a vertically against spring members 62a, but the upper ends of such guide posts are threaded for receiving holding nuts 73, so that the cold die is carried with the pressure plate by a piston and cylinder actuator 64.

The greatest difference in the device of Figures 5 and 6 over the first described form of my invention lies in the composition and formation of the punch member 12a, therein. Such punch is a two part construction comprising a substantially cylindrical inner disc portion 75 housed by and mounted for sliding relative motion within a concentrically related outer punch portion 76 having a cylindrical recess 77 formed inwardly of its lower face for receiving the punch portion 75. The portion 75 of the punch is rigidly attached to a center post 51a related to plate member 60a and is consequently directly moved in response to movements of the actuator 64.

The outer portion 76 of the punch, however, is freely mounted on the center post 51a, and is maintained in spaced parallelism to plate 60a by a compression spring 78 mounted on post 51a. When the punch mechanism is in its raised position, as shown in Figure 5, the inner disc portion 75 thereof is housed within the upper portion 76. As will be seen best in Figure 5, the lower face 79 of the inner disc portion 75 lies slightly above the lower face 80 of the outer portion 76 when the punch assembly is fully raised. This difference in spacing of the two punch portions from the web 16 at the start of the operating cycle provides a time delay in the operation of the punch permitting the holding of the thermo-plastic web between the lower face 80 of the outer punch portion and the inwardly extending portion 22a of the cold die prior to the cutting of the web by the inner punch portion as the same passes through the web passageway 21a.

In operation, the mechanism of Figures 5 and 6 is essentially similar to the device of Figures 1 through 4, differing therefrom only in the actuation of the punch 10a and the cutting operation. For comparison sake, the operation of both devices will now be set forth.

It will be appreciated that the device of Figures 1 through 4 is arranged to have the web of thermo-plastic material continuously passed between the cold and hot dies via the slotted passage means 21. This indexing or passage of the film through the cold die is carried forth when the punch member 12 is in its raised or Figure 3 position. By the time the film has been indexed to bring an uncut portion in registry beneath the circular punch 12, eccentric actuator 13 will have moved the punch downwardly slightly. Prior to full lowering of the punch member and preferably during the feeding of the thermo-plastic material, the hot die is lowered and raised for the loading of a pan or container means 17. The punch is then lowered. As the lower cutting edge of the punch travels across passageway 21, it engages and cuts the film of thermo-plastic material. The vacuum openings 52 of the punch are then in communication with the annular groove or chamber 28 of the cold die. Once the punch passes through the web of plastic material to cut a circular cover disc the vacuum holding means serves o maintain such disc on the lower end of the punch until the punch is lowered a distance sufficiently, as shown in Figure 4, to valve or disrupt the communication between vacuum openings 52 and the chamber 28 of the cold die. This function occurs substantially at the point when the plastic disc engages the flange or rim 54 of the pan or container 17. Continued downward movement of the punch, as dictated by the actuator 13, then forces the plastic disc under pressure onto the heated lip or flange of the pan to seal the same therewith. The sealing operation is then complete, after which the punch is raised, the hot die lowered and the sealed container removed.

In the operation of the device shown in Figures 5 and 6, the vacuum holding means, as mentioned, has been eliminated. In its place is substituted the dual part punch 10a and the compression spring 78. The permissive relative movement between the inner and outer portions of this punch mechanism permits a successive holding and severing action by the punch during its lowering movements. This will be perceived by a comparative inspection of Figures 5 and 6 of the drawing, Figure 5 showing the punch mechanism in its upper raised condition just prior to engagement with the film web 16. As the punch is lowered, the cold die 10a first moves against the stop 72. Since the cold die is thus arrested from further downward movement, spring 78 thereafter compresses allowing the outer portion 76 of the punch to engage and press the underlying web of covering material 16 tightly against the under extending portion 21a of the punch. Subsequent downward movement of the inner punch portion 75 cuts film 16 by movement across the passage chamber w1 thereby to form a cover disc 32a. Following the cutting operation, the inner portion of the punch forces the cover 32a into pressure engagement with the heated lip portion of the container 17, whereat the same is sealed under heat and pressure as before, the heat being supplied by the hot die.

From this description and the accompanying drawings, it will be recognized that I have herein described the features and operations of a new and improved mechanism for the automatic assembly of thermo-plastic film covers with containers. While obviously modifications, changes and substitutions of equivalents may be introduced into my mechanism, such will not depart from the spirit and scope of its inventive concepts. As a result, I do not wish to be limited to the specific forms of my device herein illustrated and described, except as may appear in the following appended claims.

I claim:

1. A device for the application of thermo-plastic covers to containers, comprising a cold die having a central opening configured according to the outline of the cover to be applied, a hot die aligned coaxially with the opening of said cold die and having a central recess for locating and holding a container to be covered, a portion of said hot die, which bounds said recess therein, presenting a planar surface for supporting a rim or lip bordering the open top of said container, such hot die portion and surface extending inwardly of the periphery of the central opening in said cold die, means for heating said hot die and particularly said surface thereon, a punch member reciprocal within the opening of said cold die and arranged to engage the said surface of said hot die with compressive force, means for reciprocating said punch toward and away from said hot die, and means for feeding a film of thermo-plastic material transversely across the opening in said cold die and between said punch and hot die, said punch when moving towards said hot die serving to cut said web of thermo-plastic material to form a cover section therefrom and thereafter press such cover section against the heated rim of said container to seal the same therewith under pressure, and means for holding said thermo-plastic material across the lower face of said punch preparatory to sealing the same to said container.

2. A device for the direct application of thermo-plastic covers to metal containers especially, comprising a cold die having a central opening shaped according to the profile of the cover to be applied, means for cooling said cold die, said cold die having a slotted passageway formed through opposite walls to accommodate the passage of a web of thermo-plastic material through said cold die and across said central opening therein, a punch member workable within the opening of said cold die, means for reciprocating said punch, a hot die located adjacently parallel said cold die and extending inwardly of the periphery of the central opening of said cold die for engagement by said punch, means on said hot die for supporting a container to be covered and particularly for supporting the same along a rim or lip portion thereof bounding its open top, means for heating said hot die to particularly heat the rim portion of said container, downward movement of said punch through said cold die serving to intially cut a cover section from said web substantially coextensive with the upper end of said container, and a vacuum system communicating with the lower face of said punch for holding such cut cover portion against the lower face of said punch until the same is pressed onto the heated rim of said container and sealed therewith under pressure and heat.

3. A device for the application of thermo-plastic covers across the open top of containers, comprising a cold die having a central opening configured according to the plan shape of the cover to be applied, a hot die disposed coaxially with the opening of said cold die and having in turn a central recess for locating and holding a container to be covered, the container being supported on said hot die particularly along a rim or lip portion bounding the open end of said container, means for heating said hot die and particularly the portion thereof upon which the rim of said container is supported, thusly to heat such rim portion; a punch assembly reciprocal within the opening of said cold die and movable toward and away from said hot die for engagement with the latter, said punch comprising concentrically related inner and outer portions, the inner portion of which conforms to the size and shape of the opening in said cold die and the outer portion of which is engageable with said cold die along a portion thereof which bounds the central opening therein, means for guiding the punch assembly for reciprocation coaxially of the opening in said cold die, a slotted passageway means formed through opposite side walls of said cold die for accommodating the travel of a web of thermo-plastic material therethrough and across the central opening therein, means for reciprocating said cold die coaxially with said punch and permitting relative movement between said cold die and punch, and a stop means located adjacent said cold die for limiting its downward movement at a position wherein the web of material is located slightly above the rim of the container being supported on said hot die, the organization of the device being such that the downward movement of said punch and cold die serve to initially move said cold die against said stop means, thereafter move the outer portion of said punch against said cold die bounding the central opening therein, to clamp the web of thermo-plastic material firmly along the boundaries of the opening in said cold die, whereafter subsequent downward movement of said inner punch portion relative to said outer punch portion and cold die cuts the web along the edge of the opening in said cold die to form a cover for said container therefrom, such cover thereafter being pressed into sealing engagement with the rim of said container by the inner portion of said punch.

4. A device for applying thermo-plastic covers to containers, comprising, a cold die having a lower section and an upper section, each of said sections having a central opening formed therein, the opening in said upper section being enlarged slightly over the opening in said lower section which latter opening conforms in size and shape to the cover to be applied, said cold die having a transverse passageway formed intermediate its two sections for the travel of a web of thermo-plastic cover material across the central opening in the lower section thereof, a two part punch comprising concentrically related inner and outer portions movable relative to one another and within the central openings, respectively, of said lower and upper cold die sections, means for reciprocating said punch coaxially of said cold die, means connecting said cold die with said reciprocating means so that said punch and cold die are simultaneously reciprocal, spring means intermediate said cold die and said reciprocating means for resiliently permitting and controlling relative movement between said cold die and said punch means, stop means located adjacent said cold die, the inner and outer portions of said punch normally being located above the lower section of said cold die when in their raised position; movement of said cold die and punch downwardly to bring said cold die against said stop means serving to cause the outer portion of said punch to hold the web of cover material along the upper face of said cold die's lower section and along the border of the central opening therein thusly to permit the inner portion of said punch subsequently to move relative said outer punch section and cleanly cut said material along the periphery of the central opening in the lower section of said cold die, a hot die having means for supporting a container concentrically of the punch and located beneath the said punch and cold die, means for heating said hot die, with a container supported in said hot die having a rim or lip portion extending over the upper end of said hot die, the inner portion of said punch after cutting a cover from said web pressing the same tightly against the rim of said container at said hot die to seal the same with said container.

5. In a device for applying thermo-sealing films to and across an open end of a container, the combination comprising a substantially annular cold die member, a substantially annular hot die member supported beneath said cold die member, said two named die members being related coaxially in parallelism; surface means formed on said hot die for supporting a container adjacent a rim or lip portion thereof which bounds the open end thereof to be covered and for positioning said rim concentrically of said cold die and inwardly, but adjacent the boundary of the open center of said cold die, a reciprocating punch means workable within and through the cold die for controlled movement toward and away from and pressure engagement with the said surface means of said hot die, and means for passing a continuous web of thermo-plastic cover material across the opening of said cold die and between the said punch and said hot die; the movement of said punch through said cold die and into engagement with said hot die serving to cut a cover section from said web and seal the same with the lip of said container under heat and pressure, and means for holding said cover section across the open end of said container perparatory to its sealing engagement therewith.

6. In a device for applying thermo-sealing films and the like to and across the open top of a container thusly to perfect a covering thereof, the combination comprising a substantially annular cold die member, means on said cold die for cooling the same in operation, a substantially annular hot die member supported beneath said cold die, said two named die members being related coaxially in spaced parallelism, said hot die having a surface formed adjacent and bounding its open center for supporting a container to be covered at a rim or lip portion thereof bordering its open end, means for heating said hot die and particularly said surface thereon, thusly to heat the rim portion of said container, a punch assembly including concentrically related inner and outer punch portions workable within said cold die for movement toward and away from and pressure engagement with the said surface of said hot die, stop means adjacent said cold die, means for carrying and reciprocating said cold die towards and away from and into engagement with said stop means, the same means serving to move said punch assembly toward and away from said hot die and relative to and within said cold die, means invading opposite walls of said cold die for the passage of a web of thermo-plastic cover material across the open center of said cold die and in between said punch and hot die, and an extending portion on said cold die for arresting downward movement of the outer punch portion prior to downward movement of its inner punch portion, the arrangement of said punch and said extending portion being such that the outer punch portion firmly clamps the web of thermo-plastic material against said cold die in spaced parallelism to said surface of said hot die after which subsequent downward movement of said inner punch portion cuts a cover section from said web and forces the same into sealing engagement with the rim of said container at said hot die.

7. In a device for applying thermo-sealing films to and across an open top or end of a container to form a cover therefore, the combination comprising an open centered, substantially annular, cold die member, means on said cold die for maintaining the same relatively cool during operation, a substantially annular hot die member supported beneath said cold die, said two named die members being related coaxially in spaced parallelism, said hot die having an upper surface bounding on open center therein for supporting a container to be covered at and along a lip or rim portion bordering the open top of the container, means for heating said hot die and particularly for heating the said rim portion of the container, said cold die having a passageway means formed through opposite walls thereof for the travel of a continuous web of thermo-plastic material across its center opening and parallel to said surface of said hot die, and a punch means vertically workable within the cold die for controlled reciprocal movement toward and away from and pressure engagement with the said surface of said hot die, downward movement of said punch through said cold die serving to initially sever the web of material according to the outline of the opening in said cold die thusly to cut out a cover for said container, and means for holding such cut cover section adjacent the lower face of said punch means during its continued downward movement and until the same is sealed with said container's lip portion.

References Cited in the file of this patent

UNITED STATES PATENTS

| 1,266,913 | Braecklein | May 21, 1918 |
| 2,302,846 | Farmer | Nov. 24, 1942 |
| 2,378,324 | Ray et al. | June 12, 1945 |